Patented Apr. 26, 1938

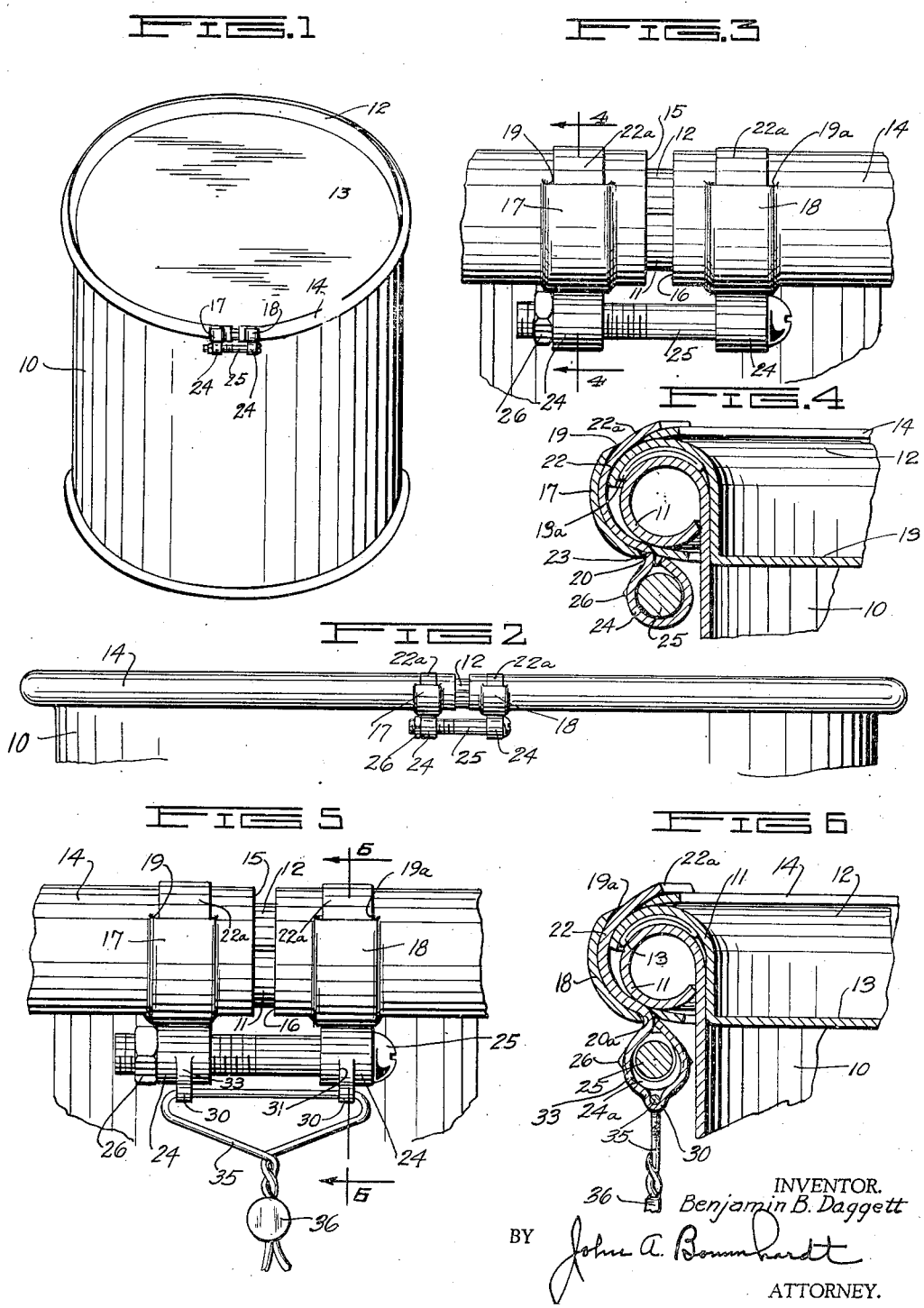

2,115,361

UNITED STATES PATENT OFFICE 2,115,361

SEALING RING FOR CONTAINERS

Benjamin B. Daggett, Lake Line Village, Willoughby, Ohio

Application July 31, 1936, Serial No. 93,644

2 Claims. (Cl. 220—61)

This invention relates to clamping rings or seals for the removable heads of containers, the heads and containers usually being of metal, but the device is capable of use with containers made of stiff paper, wood, or any other like material.

An object of the invention is to provide a clamping ring, the ends of which are locked together and forced snugly around the end of a container as by a bolt and nut connection, said bolt passing through loops or eyes formed adjacent the respective ends of the ring.

Another object of the invention is to provide a ring having a substantially smooth interior surface which facilitates the clamping action, and one which requires no welding or soldering to put the ring in place.

Other objects and advantages will be apparent from the following detailed description and drawing in which:

Fig. 1 is a perspective view showing the clamping ring in locked position on a metal drum.

Fig. 2 is an enlarged elevation of the ring shown in Fig. 1.

Fig. 3 is an enlarged fragment of the ring and locking device.

Fig. 4 is a section on the line 4—4 of Fig. 3.

Fig. 5 is an enlarged fragmentary view showing a modified form.

Fig. 6 is a section on the line 5—5 of Fig. 5.

In the drawing in which like numerals indicate similar parts, 10 indicates a drum or other container having a rolled top edge 11. Mounted thereon is a cover 13 having a semi-curved edge 12 and a sealing member or washer 13a mounted between the rim of the drum and the cover. All of the above is old and well known.

As best shown in Fig. 4, I provide a sealing ring 14 semi-circular in section, said ring being mounted to fit over the cover edge and the rolled edge of the container. As will be seen this sealing ring 14 is split and has open ends 15 and 16 and adjacent the respective ends the ring 14 has outwardly pressed raised portions 17 and 18 forming channel members, each of which has a longitudinal slot or opening 19, 20, and 19a, 20a, formed at the top and bottom, said slots or openings permitting the insertion of locking clamps 22, the upper ends 22a fitting and conforming substantially to the contour of the outer surface of the sealing ring.

The said clamps 22 terminate at their lower ends in eyes 24 adjacent to and below the openings 20 and 20a. Through the eyes 24 is mounted a bolt or the like 25 having a nut 26 for securing the same therein. It will of course be noted that the eyes 24 may be made in various forms if desired, as for instance, they may be made round, square, oval or of any other form.

In the modified form shown in Figs. 5 and 6 the eye members 24 have a small loop 30 formed thereon. The eyes 24 are slotted at 31 and 32, the center portion 33 thus formed is pressed outwardly and drawn into a loop 30.

In operation the cover 13 is placed in position on the top of the open drum or container 10, the sealing ring 14 is then mounted thereon, the two open ends 15 and 16 being drawn as close together as possible, the bolt 25 is then thrust through the eyes 24 of the locking clamps 23 and the nut 26 is turned upon the bolt until the open ends 15 and 16 of the sealing ring 14 are drawn as near together as possible, thus providing a firm, tight seal between the cover 13 and the container 10.

In the modified form an additional function is performed as by passing a wire 35 through the loops 30, twisting the ends of the wire together and placing thereon a seal 36 which prevents any unauthorized opening of the container.

I claim:

1. A sealing ring for containers, said ring having outwardly pressed portions at its respective ends, forming channels extending transversely of said ends, with slots at the top and bottom of said outwardly pressed portions, said slots extending lengthwise of the ring, clamping plates extending through said slots and channels and provided at their ends with means for receiving a fastening device, and means cooperating with said means for drawing the clamping members and the ends of the ring toward each other.

2. A sealing ring for containers, said ring having outwardly pressed portions at its respective ends, with longitudinal slots at the top and bottom of said outwardly pressed portions, said slots permitting the passage therethrough of clamping members, clamping members comprising plates terminating at their lower ends in loops or eyes, and a bolt and nut fastening member connecting the eyes, for urging the ring into tight contact with the cover of a container, the plane of the width of the plates being substantially parallel to the line of draw of the bolt.

BENJAMIN B. DAGGETT.